(12) United States Patent
Jerdev

(10) Patent No.: US 8,131,072 B2
(45) Date of Patent: Mar. 6, 2012

(54) METHOD AND APPARATUS FOR REDUCING IMAGE ARTIFACTS BASED ON APERTURE-DRIVEN COLOR KILL WITH COLOR SATURATION ASSESSMENT

(75) Inventor: Dmitri Jerdev, South Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 1135 days.

(21) Appl. No.: 11/944,933

(22) Filed: Nov. 26, 2007

(65) Prior Publication Data

US 2009/0136150 A1    May 28, 2009

(51) Int. Cl.
    *G06K 9/00* (2006.01)
(52) U.S. Cl. ......... 382/167; 382/205; 382/264; 382/272
(58) Field of Classification Search ................... 382/167, 382/205, 264, 272
    See application file for complete search history.

(56) References Cited

U.S. PATENT DOCUMENTS

| | | | |
|---|---|---|---|
| 4,812,903 A * | 3/1989 | Wagensonner et al. ........ | 358/521 |
| 5,481,628 A * | 1/1996 | Ghaderi ......................... | 382/261 |
| 5,805,216 A * | 9/1998 | Tabei et al. .................... | 348/246 |
| 5,903,681 A * | 5/1999 | Rueby et al. ................... | 382/266 |
| 6,140,630 A | 10/2000 | Rhodes | |
| 6,151,064 A * | 11/2000 | Connolly et al. ............... | 348/93 |
| 6,195,467 B1 * | 2/2001 | Asimopoulos et al. ....... | 382/261 |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,501,565 B1 * | 12/2002 | Karidi et al. .................... | 358/1.9 |
| 6,721,000 B1 * | 4/2004 | Lin et al. ..................... | 348/223.1 |
| 6,795,083 B2 * | 9/2004 | Bao et al. ...................... | 345/589 |
| 6,806,902 B1 * | 10/2004 | Donovan ...................... | 348/246 |
| 6,842,541 B2 * | 1/2005 | Curry ........................... | 382/270 |
| 7,433,512 B2 * | 10/2008 | Van Der Heide ............. | 382/167 |
| 7,580,589 B2 * | 8/2009 | Bosco et al. ................... | 382/275 |
| 7,728,844 B2 * | 6/2010 | Trimeche et al. ............. | 345/589 |
| 7,751,641 B2 * | 7/2010 | Petrosyan et al. ............ | 382/266 |
| 7,756,355 B2 * | 7/2010 | Kryda et al. ................... | 382/275 |
| 7,773,826 B2 * | 8/2010 | Watanabe et al. ............. | 382/274 |
| 7,957,606 B2 * | 6/2011 | Schoner ........................ | 382/263 |
| 7,969,488 B2 * | 6/2011 | Jerdev .......................... | 348/246 |
| 7,991,235 B2 * | 8/2011 | Fan et al. ....................... | 382/232 |
| 8,023,764 B2 * | 9/2011 | Miyake et al. ................ | 382/275 |
| 2002/0114513 A1 * | 8/2002 | Hirao ............................ | 382/167 |
| 2002/0164084 A1 * | 11/2002 | Baggs ............................ | 382/275 |
| 2003/0048368 A1 * | 3/2003 | Bosco et al. ................... | 348/272 |
| 2003/0179418 A1 * | 9/2003 | Wengender et al. .......... | 358/437 |
| 2006/0257046 A1 * | 11/2006 | Rai et al. ....................... | 382/275 |
| 2007/0030365 A1 * | 2/2007 | Jerdev .......................... | 348/241 |
| 2007/0133893 A1 * | 6/2007 | Jerdev .......................... | 382/254 |
| 2008/0075385 A1 * | 3/2008 | David et al. ................... | 382/275 |

* cited by examiner

*Primary Examiner* — Jayesh A Patel

(57) ABSTRACT

A method and apparatus for reducing false color artifacts in digital images. Aperture correction and color saturation values are determined for a portion of an image surrounding a subject pixel. A color attenuation value is determined based at least in part on the aperture correction and color saturation values. A color value of the subject pixel is adjusted by an amount based at least in part on the color attenuation value. In one exemplary embodiment, the method and apparatus operate in the YUV color space and adjust U and V values of the subject pixel proportionally to the color attenuation value.

18 Claims, 4 Drawing Sheets

METHOD AND APPARATUS FOR REDUCING IMAGE ARTIFACTS BASED ON APERTURE-DRIVEN COLOR KILL WITH COLOR SATURATION ASSESSMENT

FIELD OF THE INVENTION

The disclosed embodiments relate generally to processing images and, more particularly, to methods and apparatuses for reducing image artifacts.

BACKGROUND

Imagers typically consist of an array of pixel cells containing photosensors. Each pixel cell produces a signal corresponding to the intensity of light impinging on its photosensor when an image is focused on the array by one or more lenses. These signals may be stored in a memory and displayed on a monitor, manipulated by software, printed to paper, or otherwise used to provide information about the image. The magnitude of the signal produced by each pixel is substantially proportional to the amount of light impinging on a respective photosensor.

Several kinds of imagers are generally known. Complementary metal-oxide-semiconductor ("CMOS") imagers and charge coupled device ("CCD") imagers are among the most common. CMOS imagers are discussed, for example, in U.S. Pat. Nos 6,140,630, 6,376,868, 6,310,366, 6,326,652, 6,204,524, and 6,333,205, all assigned to Micron Technology, Inc.

Images generated from CMOS or other imagers typically comprise thousands or even millions of picture elements called "pixels" arranged in rows and columns. One or more values, each usually comprising 8 or more bits, are typically associated with each pixel. In a grayscale image, just one value corresponding to brightness is associated with each pixel. In color images, three or four values are associated with each pixel, depending on the color space used by the imager or processing software. RGB and YUV are two common color spaces. In the RGB color space, a red value (R), a blue value (B), and a green value (G) are associated with each pixel. In the YUV color space, a brightness value (Y) and two chrominance values (U and V) are associated with each pixel.

Digital image processing can be used to enhance or correct errors in color images. Aliasing artifacts are one common error. Aliasing occurs when detail in a scene exceeds the sampling frequency of the imager, for example, when the lines of detail in an image exceed the number of rows of pixels in the pixel array of an imager. Aliasing can result in false color artifacts along edges of details in an image and especially along edges involving an abrupt black-to-white transition. In the YUV color space described above, false color artifacts may be exhibited as pixels whose chrominance (U and V) values are too high, causing the pixels to appear intensely colored when they should be more muted or even gray. The tendency of lenses to refract different wavelengths of light differently, is another common cause of false color artifacts.

Correcting the root causes of false color artifacts requires additional hardware components or substitution of higher-quality hardware components, for example a pixel array with more pixels or lenses that refract varying wavelengths of light more evenly. These solutions are often impractical, particularly in low-cost imagers. Therefore, a less expensive method for correcting false color artifacts, particularly one which does not require additional or higher-quality hardware, is desirable.

DETAILED DESCRIPTION OF THE DISCLOSED EMBODIMENTS

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely exemplary. The sequence of steps is not limited to that set forth herein and may be changed or reordered, with the exception of steps necessarily occurring in a certain order.

The embodiments described herein provide a method and apparatus for reducing false color artifacts, including those along black-to-white transitions, without the need for additional or higher-quality hardware. The embodiments may be implemented within an image processor associated with a pixel array in an image capture device or may be implemented in a separate image processor which receives captured image data.

In the embodiments described herein, an aperture correction value corresponding to the magnitude and sharpness of brightness transitions in the vicinity of a subject pixel is determined. An attenuation value is determined based on the aperture correction value, a color saturation value of the subject pixel and neighboring pixels, and optionally a gain setting. The color saturation of the subject pixel is adjusted based on the attenuation value. For example, the color saturation of an intensely-colored pixel near a sharp black-to-white transition may be reduced more than the color saturation of a muted pixel in a portion of the image having more uniform brightness or a pixel near a transition which is not black-to-white. By adjusting the color saturation of many pixels of an image in accordance with the disclosed embodiments, false color artifacts can be reduced without significantly reducing desirable coloration, e.g. without turning green grass gray.

Figure 1:
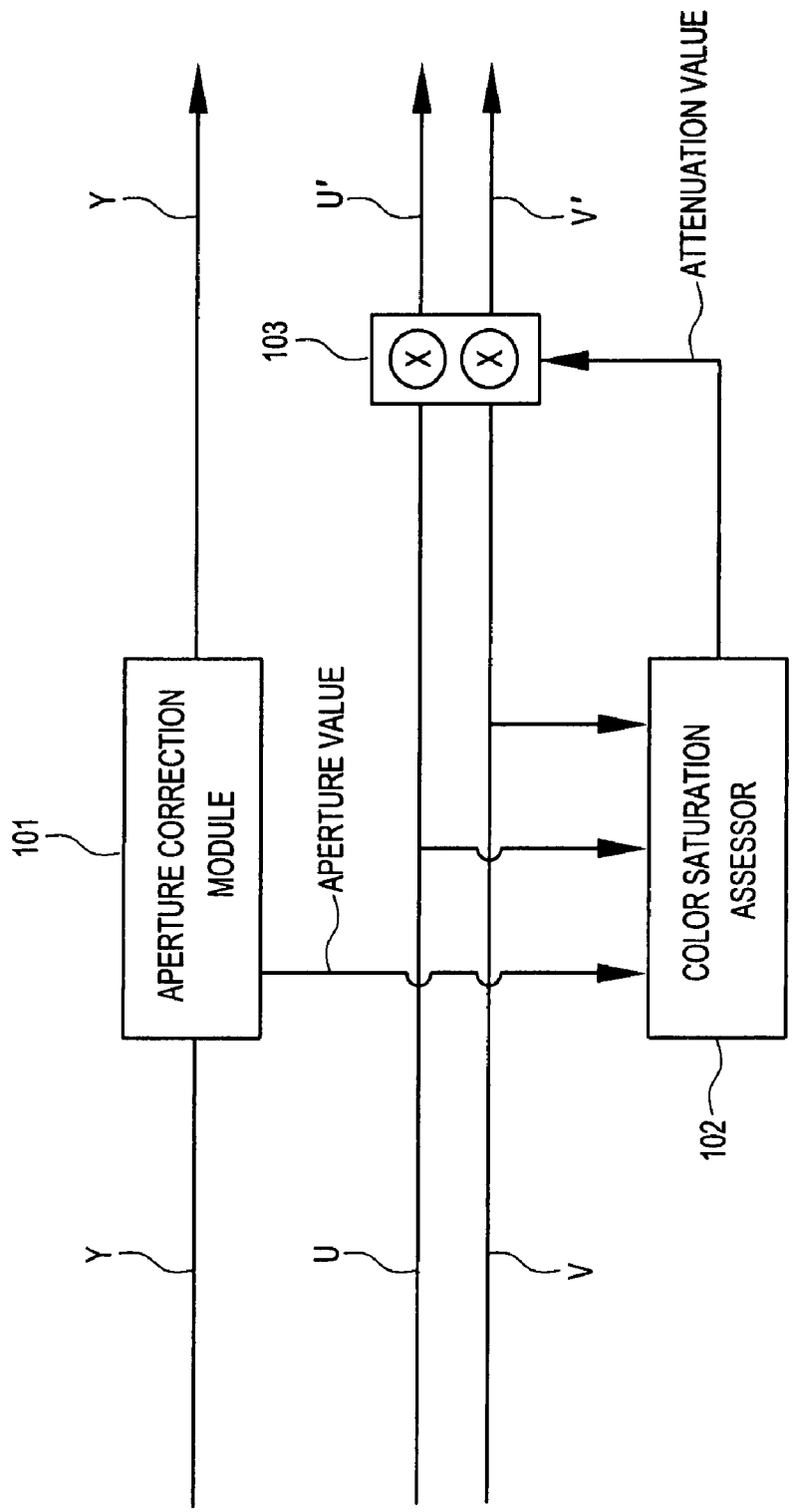
FIG. 1 is a block diagram of a system for reducing false color artifacts in accordance with a disclosed embodiment.
Figure 2:
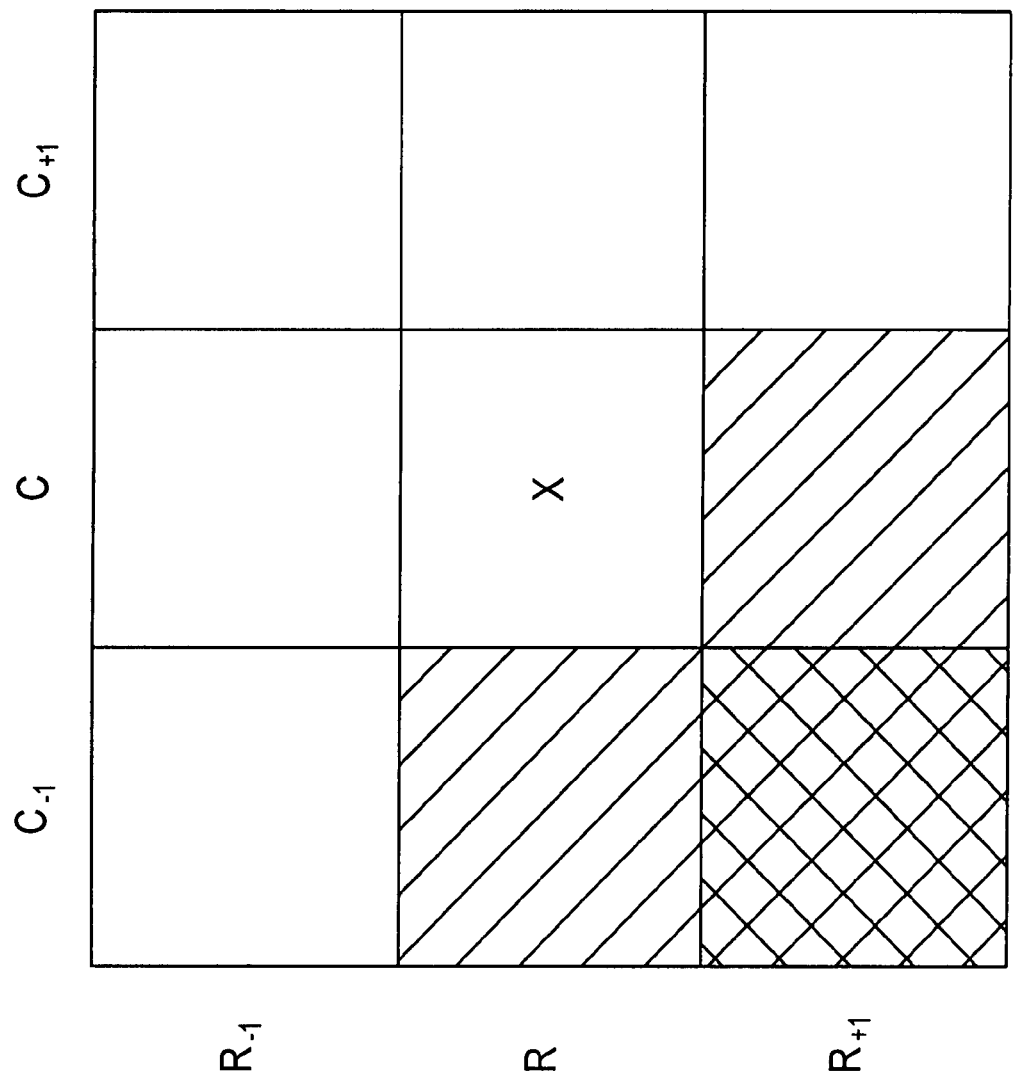
FIG. 2 illustrates a portion of a pixel array shaded to highlight some of the pixels used to assess local color saturation in accordance with a disclosed embodiment.

FIG. 1 is a block diagram of system for reducing false color artifacts in accordance with a disclosed embodiment. The system operates on a subset of pixels of an image, referred to herein as a "window" of the image, and on pixel values in the YUV color space. Pixel values in the RBG color space or another color space can be convertered to the YUV color space for processing as disclosed herein. The window could be a 3×3 pixel window, as illustrated in FIG. 2, or a larger window, such as, for example, a 5×5 pixel window. The pixel whose values are to be adjusted by the system is referred to herein as the "subject" pixel. The subject pixel is typically, though not necessarily, at the center of the window. In FIG. 2, the subject pixel is located at row R and column C of the image and is denoted by an "x" within the pixel.

Referring again to FIG. 1, an aperture correction module 101 receives brightness values (Y values) for pixels in the window and determines a corresponding aperture value, denoted as P below. Many aperture correction algorithms are known in the art and can be used to generate the aperture value. Preferably, the aperture correction algorithm performed by the aperture correction module 101 generates an aperture value proportional to the edge content within the window. Typically, edge content is quantified by examining the sharpness and magnitude of brightness transitions.

A color saturation assessor 102 receives the aperture value output by the aperture correction module 101 and the chrominance values (U and V values) for pixels in the window. Based on the U and V values, the color saturation assessor 102 determines a color saturation value for the window, as described in greater detail below. The color saturation value is preferably proportional to the color saturation of pixels within the window.

In one embodiment, the color saturation value is determined by averaging the absolute values of chrominance values of each corner pixel in the window with absolute values of chrominance values of respective neighboring pixels and selecting the average that mostly closely matches the absolute values of the chrominance values of the subject pixel. The selected average can then be mapped or scaled to one of a range of color saturation values. More specifically, and with reference to FIG. 2, absolute value of the U value of the corner pixel at row $R_{+1}$ and column $C_{-1}$ of the window, shaded with a cross pattern, is averaged with the absolute values of U values of neighboring pixels, shaded with diagonal parallel lines. Similarly, the absolute values of the V value of the corner pixel is averaged with the absolute values of the V values of neighboring pixels to yield an average UV value pair for the corner pixel at row $R_{+1}$ and column $C_1$ of the window. Average UV value pairs for other corner pixels can be computed similarly. The average UV value pair most closely matching the absolute values of the U and V values of the subject pixel is selected and used to determine a color saturation value, denoted as S and described further below.

In the illustrated embodiment, only pixels within the window which are above, below, to the left of, and to the right of, a corner pixel are considered neighbors. However, in alternative embodiments, other pixels within a window, such as those diagonally adjacent to a corner pixel or those that are one or more pixels removed from a corner pixel may also be considered neighbors. The size of the window can also be increased to, for example, a 5×5 window.

The color saturation assessor 102 also determines an attenuation value representing an amount by which the chrominance values (U and V values) of the subject pixel can be adjusted to reduce false color artifacts. The attenuation value, A, can be determined as follows:

$$A = \max[0, 1-(P \times S \times G)]$$

wherein P is the aperture value, S is the color saturation value, and G is an optional gain setting. The gain setting G may be specified by a user or determined by an automatic gain correction algorithm.

As is apparent from the formula above, the product of P, S, and G must be less than 1 to affect the attenuation value A. (If the product of P, S, and G is greater than or equal to 1, then the maximum function will return 0.) The parameters P, S, and G can be scaled to yield an attenuation value A that best reduces false color artifacts, as determined, for example, by qualitative human review during imager design or manufacturing. The parameters are preferably scaled such that each is within the range 0.0 to 1.0. For example, U and V values with a high absolute value might yield a saturation value near 1.0 while U and V values with a low absolute value might yield a saturation value near 0.0. The precise scaling method used may vary based on several factors, including, for example, the output range of the aperture correction algorithm used and the magnitude of color saturation attenuation desired. To avoid introducing new color artifacts, the same attenuation value is preferably used for all color channels (e.g., both the U and V channels in the YUV color space).

Still referring to FIG. 1, element 103 adjusts the U and V values associated with the subject pixel based at least in part on the attenuation value output by the color saturation assessor 102. In one embodiment, element 103 multiplies the U value of the subject pixel by the attenuation value, yielding a U' value. A V' value can be computed similarly as the product of A and V. The U' and V' values output by element 103 are then substituted for the original U and V values of the subject pixel. Thus, after adjustment by element 103, the color saturation of the subject pixel will be at a maximum equal to the subject pixel's original color saturation and at a minimum equal to 0.0. indicating the pixel has been rendered colorless. The brightness value, Y, is not altered by element 103.

By repeating the method just described with reference to FIG. 1 for all pixels in an image, false color artifacts can be reduced throughout the image. For example, if a portion of a color image depicts small black text on a white background, pixels on the edges of the letters might appear to be colored rather than merely shades of gray. By replacing the color (U and V) values associated with these pixels with attenuated color (U and V) values, according to the embodiment described above, the false color exhibited by these pixels will be reduced. In other words, the color saturation of pixels on the edges of the letters will be reduced so the pixels appear more gray rather than artificially-colored.

Although FIG. 1 illustrates an embodiment operating in the YUV color space, alternative embodiments can be configured to operate in other color spaces. As is known to those of skill in the art, pixel values in other color spaces, for example RGB, can be convened to the YUV color space and vice-versa.

Figure 3:
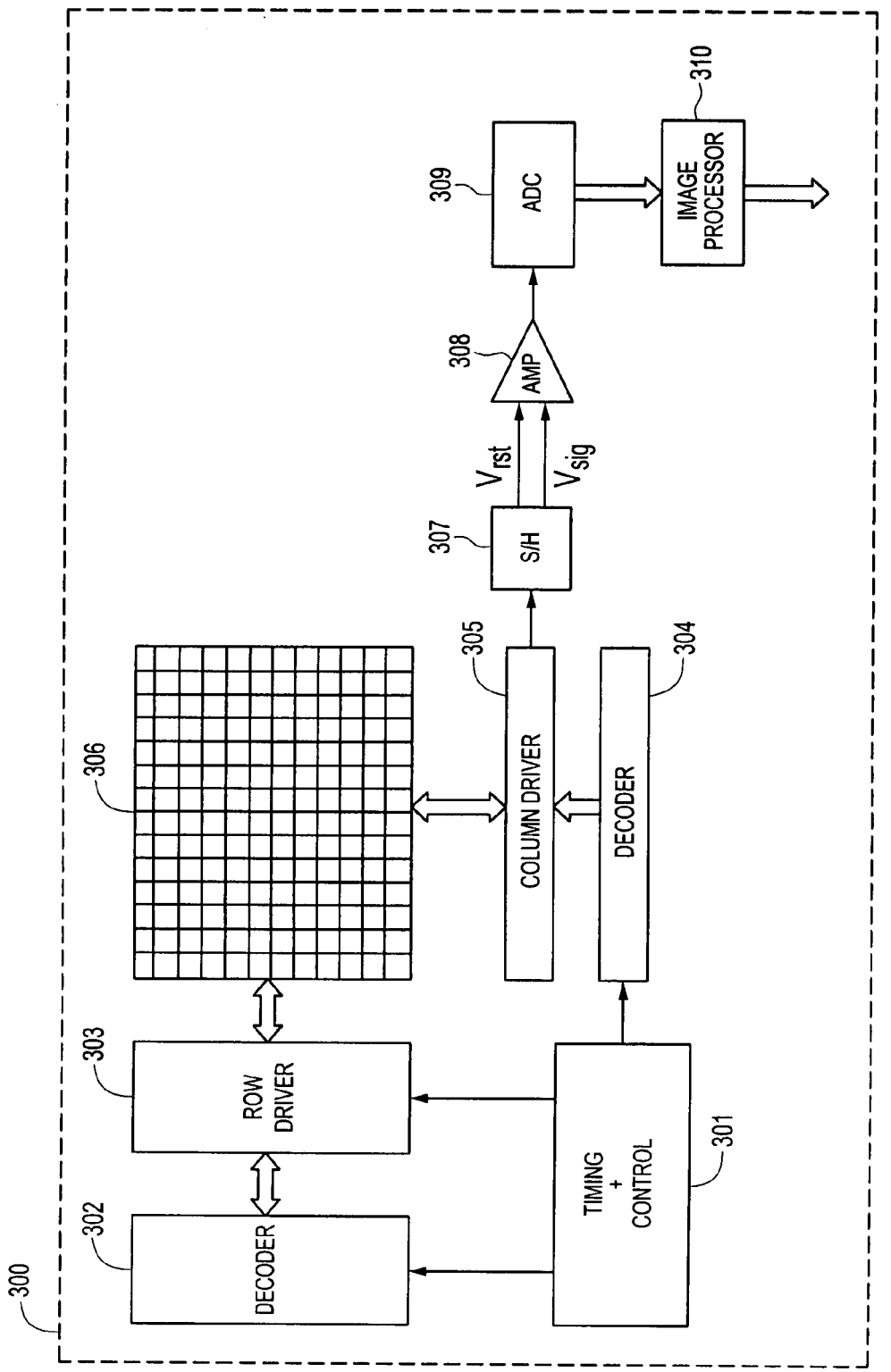
FIG. 3 is a partial top-down block diagram of an imager and associated read-out circuitry constructed in accordance with a disclosed embodiment.

The following paragraphs describe how to implement embodiments of the disclosure in an imager and a processor system. FIG. 3 illustrates a partial top-down block diagram view an imager 300 and associated read-out circuitry constructed in accordance with an embodiment disclosed herein. Although FIG. 3 illustrates a CMOS imager and associated read-out circuitry, embodiments may employ other types of imagers, for example a CCD imager.

When the imager 300 is operated to capture light, the pixel cells in each row of pixel array 306 are all turned on at the same lime by a row select line, and the signals of the pixel cells of each column are selectively output onto output lines by respective column select lines. A plurality of row and column select lines are provided for the array. The row lines are selectively activated in sequence by a row driver 303 in response to a row address decoder 302 and the column select lines are selectively activated in sequence for each row activation by a column driver 305 in response to a column address decoder 304. Thus, row and column addresses are provided for each pixel cell of the pixel array 306. The imager 300 is operated by the timing and control circuit 301, which controls the address decoders 302, 304 for selecting the appropriate row and column select lines for pixel cell read-out, and row and the column drivers 303, 305, which apply driving voltage to the drive transistors of the selected row and column lines.

In a CMOS imager, the pixel cell output signals typically include a pixel reset signal $V_{rst}$ taken off of a floating diffusion region (via a source follower transistor) when it is reset and a pixel image signal $V_{sig}$, which is taken off the floating diffusion region (via the source follower transistor) after charges generated by an image are transferred to it. The $V_{rst}$ and $V_{sig}$ signals for each pixel of pixel array 306 are read by a sample and hold circuit 307 and are subtracted by a differential amplifier 308 that produces a difference signal ($V_{rst}$-$V_{sig}$) for each pixel cell of pixel array 306, which represents the amount of light impinging on the pixel cell. This signal difference is digitized by an analog-to-digital converter (ADC) 309. The digitized pixel signals are then fed to an image processor 310 which processes the pixel signals and forms a digital image output. It is also possible to have separate driver and read-out circuits for each sub-array with the pixel output signal from the ADC 309 of each sub-array feeding into a common image processor circuit 310. As depicted in FIG. 3, the imager 300 is formed on a single semiconductor chip, although other configurations are possible, as known in the art.

Image processor circuit 310 may be constructed as a hardware circuit with associated memory, or as a programmed processor with associated memory, or as a combination of a hardware circuit and a programmed processor with associated memory. In one embodiment, the image processor circuit 310 is a pixel signal pipeline processing circuit configured to implement false color artifact reduction in accordance with embodiments disclosed herein. False color artifact reduction is typically implemented late in the pixel processing pipeline, after demosaicing, because artifact reduction algorithms often operate on multi-channel data for each pixel, e.g. RGB or YUV values for each pixel, rather than raw pixel data received from the pixel array. Other configurations are possible, however. For example, false color artifact reduction might be not be performed in the pixel processing pipeline at all but rather by a central processing unit (CPU) 404 connected to the imager 300 by a bus 403, as shown in FIG. 4, or by a stand alone computer that receives an image from imager 300 via ant communications medium, e.g. a memory device, a transmission system, etc.

Figure 4:
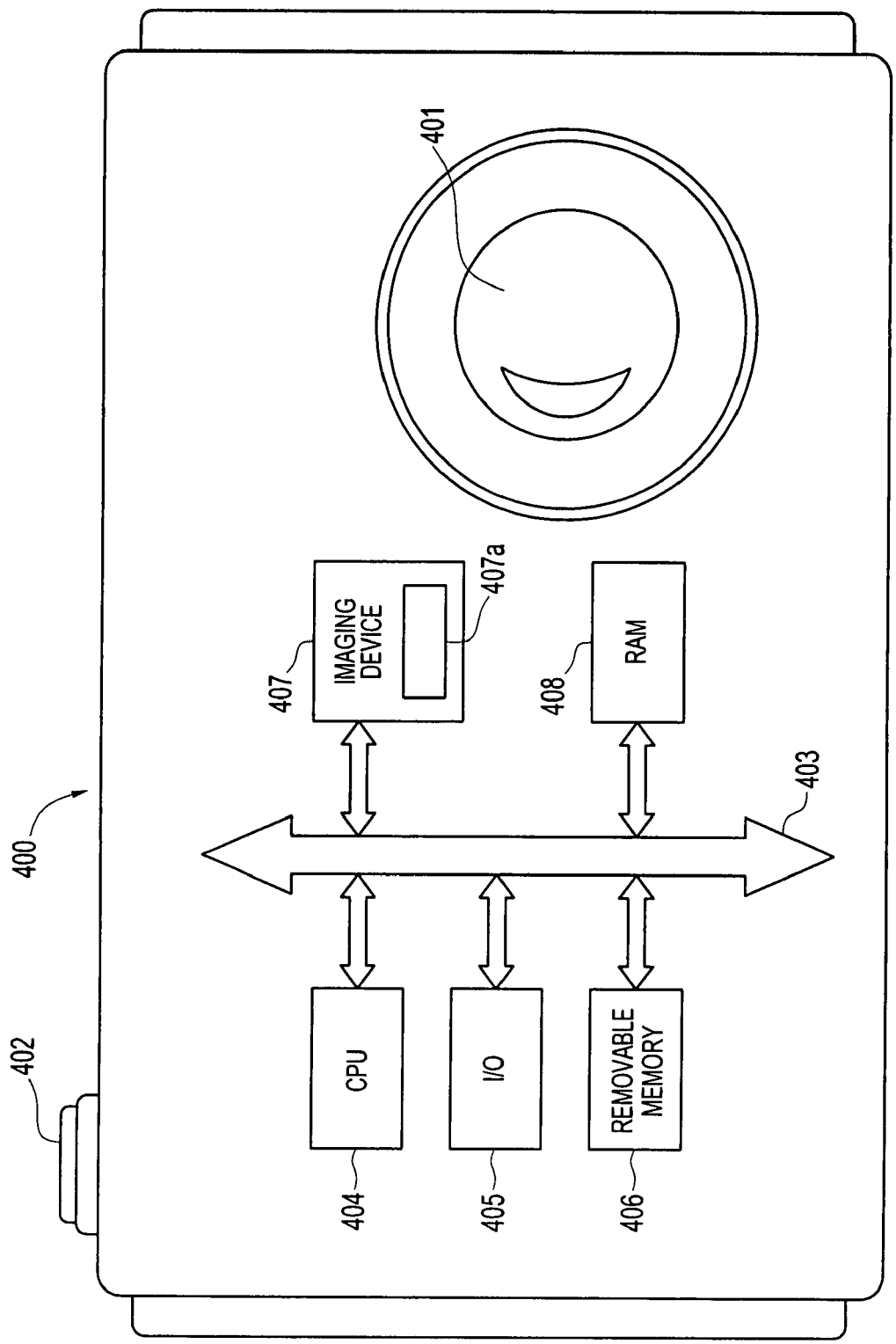
FIG. 4 illustrates a processor system constructed in accordance with a disclosed embodiment.

FIG. 4 shows a typical processor system 400, such as, for example, a digital camera. The system 400 includes a CPU 404 configured to implement false color artifact reduction in accordance with embodiments disclosed herein. Without being limiting, such a system could also be a personal computer or workstation, camera, scanner, machine vision, vehicle navigation system, video phone, surveillance system, auto focus system, star tracker system, motion detection system, image stabilization system, or any other system able to implement false color artifact reduction in accordance with disclosed embodiments.

In one embodiment in which the system 400 is a digital camera, the system 400 includes a lens 401 for focusing an image on a pixel array 407a of an imaging device 407 when a shutter release button 402 is pressed. System 400 also comprises the CPU 404, such as a microprocessor that controls camera functions and image flow, and communicates with an input/output (I/O) device 405 over a bus 403. The CPU 404 might also perform false color artifact reduction, although this could be accomplished by another processor or even a dedicated image processing chip (not shown). The imager 407 of device 400 also communicates with the CPU 404 over the bus 403. The processor system 400 also includes random access memory (RAM) 408, and can include removable memory 406, such as flash memory, which also communicates with the CPU 404 over the bus 403. The imaging device 407 may be combined with the CPU 404, with or without memory storage on a single integrated circuit or on a different chip than the CPU.

In another embodiment, the system 400 is a personal computer comprising a CPU 404, which communicates with an I/O device 405 and RAM 408 over a bus 403. In this embodiment. the system 400 does not necessarily include an imaging device 407. Rather, digital pixel values are transferred from another device, for example a digital camera, via any communications medium, for example by the I/O device 405. The digital pixel values may be in the form of a RAW image file generated by a digital camera or any other suitable image format, such as, for example, Tagged Image File Format (TIFF). The I/O device might be, for example, a USB port, a memory card reader, a network port, a parallel port, a serial port, a FireWire port, a floppy disk drive, an optical disk drive, or a wireless transceiver. Once loaded in a memory, for example RAM 408 or possibly non-volatile storage such as a hard drive (not shown), the CPU 404 can perform false color artifact reduction in accordance with the embodiments disclosed herein. The resulting image might then be saved in a memory, for example removable memory 406 or RAM 408, output via an output device (not shown), for example a photo printer, posted on the Internet, or manipulated further by software, such as, for example, Adobe Photoshop®. Indeed, software such as Adobe Photoshop® may be configured to implement the disclosed embodiments by, for example, a plug-in program module or by programming a filter or macro.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. Accordingly, the claimed invention is not to be seen as limited by the foregoing description, but is only limited by the scope of the attached claims.

What is claimed as new and desired to be protected by Letters Patent of the United States is:

1. A method of reducing false color artifacts in an image, the method comprising:
   determining an aperture value based at least in part on brightness values of pixels in a window surrounding a subject pixel;
   determining a color saturation value based at least in part on color values of pixels in the window;
   determining an attenuation value based at least in part on the aperture value and the color saturation value; and
   adjusting a color value of the subject pixel based at least in part on the attenuation value, wherein the color saturation value is proportional to color saturation within the window, wherein the window is a 3×3 pixel window and the subject pixel is located at the center of the window, and wherein the color saturation value is determined by:
   averaging an absolute value of color value of each corner pixel in the window with absolute values of color values of respective neighboring pixels within the window to obtain a respective average color value for each corner pixel in the window;
   comparing each average color value with the absolute value of the color value of the subject pixel; and
   selecting the average color value closest to the color value of the subject pixel.

2. The method of claim 1, wherein the aperture value is proportional to edge content in the window surrounding the subject pixel.

3. The method of claim 1, wherein the attenuation value is determined by selecting a maximum of 0 and a difference of 1 and a product of the aperture value, the color saturation value and a gain setting.

4. The method of claim 1, wherein the adjusting step comprises multiplying the color value of the subject pixel by the attenuation value.

5. A method of reducing false color artifacts in an image in the YUV color space, the method comprising:
   determining an aperture value for a window of the image surrounding a subject pixel based on brightness Y values in the YUV color space of pixels in the window;
   determining a color saturation value based on chrominance U and V values in the YUV color space of pixels in the window;
   determining an attenuation value based on the aperture value and the color saturation value; and
   adjusting chrominance U and V values in the YUV color space of a subject pixel within the window based on the attenuation value, wherein the color saturation value is determined by:
      averaging absolute values of chrominance U and V values of each corner pixel in the window and absolute values of chrominance U and V values of respective neighboring pixels to form four chrominance value pairs, each pair comprising an average U value and an average V value;
      comparing each chrominance value pair with absolute values of chrominance values of the subject pixel; and
      selecting the chrominance value pair closest to the chrominance values of the subject pixel.

6. The method of claim 5, wherein the aperture value is a measure of brightness transitions within the window.

7. The method of claim 5, wherein the neighboring pixels comprise pixels adjacent to a respective corner pixel.

8. The method of claim 7, wherein the neighboring pixels further comprise pixels within the window and diagonally adjacent to a respective corner pixel.

9. The method of claim 5, wherein the neighboring pixels further comprise pixels at least one pixel removed from a respective corner pixel.

10. The method of claim 5, wherein the attenuation value, A, is determined as follows:

$$A = \max[0, 1-(P \times S \times G)]$$

wherein P is the aperture value, S is the color saturation value, and G is a gain setting.

11. The method of claim 5, wherein the adjusting step comprises determining new chrominance U and V values of the subject pixel, U' and V' respectively, as follows:

$$U' = U \times A$$

$$V' = V \times A$$

wherein A is the attenuation value.

12. An imager, the imager comprising:
   a pixel array for generating image data; and
   a processor configured to receive and process the image data from the pixel array, the processor configured to:
      determine an aperture value for a window of pixels of the image data;
      determine a color saturation value for the window;
      determine an attenuation value based at least in part on the aperture and color saturation values; and
      adjust a value of a subject pixel within the window based at least in part on the attenuation value, wherein the processor is further configured to determine the color saturation value by:
         averaging a value of each corner pixel in the window with values of respective neighboring pixels to obtain an average for each corner pixel in the window;
         comparing each average with the value of the subject pixel; and
         selecting the average closest to the value of the subject pixel.

13. The imager of claim 12, wherein the attenuation value is determined by selecting a maximum of 0 and a difference of 1 and a product of the aperture value, the color saturation value, and a gain setting.

14. The imager of claim 12, wherein the adjusting step comprises multiplying the value of the subject pixel by the attenuation value.

15. The imager of claim 12, wherein the imager forms a part of a digital camera.

16. A system for reducing image artifacts, the system comprising:
   an input device configured to provide image data; and
   a processor coupled to the input device and configured to:
      determine an aperture value for a window of the image;
      determine a color saturation value of the window:
      determine an attenuation value based at least in part on the aperture and color saturation values; and
      adjust a color saturation value of a subject pixel within the window based at least in part on the attenuation value, wherein the processor is configured to determine the color saturation value of the window by:
         averaging a value of each corner pixel in the window with values of respective neighboring pixels to obtain an average for each corner pixel in the window;
         comparing each average with the value of the subject pixel; and
         selecting the average closest to the value of the subject pixel.

17. The system of claim 16, wherein the attenuation value is determined by selecting a maximum of 0 and a difference of 1 and a product of the aperture value, the color saturation value and a gain setting.

18. The system of claim 16, wherein the adjusting step comprises multiplying the value of the subject pixel by the attenuation value.

* * * * *